(12) United States Patent
Bilodeau

(10) Patent No.: US 6,545,064 B1
(45) Date of Patent: Apr. 8, 2003

(54) COATING COMPOSITION COMPRISING ETHOXYLATED DIACRYLATES

(75) Inventor: Wayne Louis Bilodeau, Mentor, OH (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/448,877

(22) Filed: Nov. 24, 1999

(51) Int. Cl.$^7$ .......................... C08F 2/46; C09D 133/08
(52) U.S. Cl. .......................... 522/7; 522/8; 522/13; 522/15; 522/17; 522/18; 522/21; 522/31; 522/42; 522/46; 522/64; 522/181; 522/173; 526/328
(58) Field of Search .................. 522/182, 181, 522/173, 179, 183, 13, 17, 21, 42, 46, 7, 8, 31, 59, 64, 15, 18; 526/89, 145, 146, 328

(56) References Cited

U.S. PATENT DOCUMENTS

| | | | |
|---|---|---|---|
| 3,884,707 A | 5/1975 | Dick et al. ...................... 106/24 |
| 4,088,442 A | 5/1978 | Huggelin et al. ................ 8/2.5 |
| 4,115,232 A | 9/1978 | Nyi et al. ............... 204/159.23 |
| 4,499,225 A | 2/1985 | Kubo et la. .................. 524/276 |
| 4,677,179 A | 6/1987 | Hannemann .................. 528/45 |
| 4,942,060 A | 7/1990 | Grossa ....................... 427/54.1 |
| 5,206,273 A | 4/1993 | Chen et al. .................. 523/300 |
| RE34,792 E | 11/1994 | Baker et al. ..................... 106/6 |
| 5,376,170 A | 12/1994 | Baker ......................... 106/271 |
| 5,418,016 A | 5/1995 | Cornforth et al. ........... 427/515 |
| 5,498,652 A | 3/1996 | Chen ............................ 524/219 |
| 5,502,139 A | * 3/1996 | Toh et al. |
| 5,543,451 A | 8/1996 | Chen et al. .................. 524/224 |
| 5,660,937 A | 8/1997 | Ishidoya et al. .......... 428/423.1 |
| 5,663,211 A | * 9/1997 | Kominami et al. ............ 522/14 |
| 5,667,856 A | 9/1997 | Kamen et al. .............. 428/34.6 |
| 5,804,301 A | 9/1998 | Curatolo ...................... 428/352 |
| 5,888,649 A | 3/1999 | Curatolo et al. ............ 428/352 |
| 6,001,893 A | * 12/1999 | Vaidya et al. .................. 430/18 |

FOREIGN PATENT DOCUMENTS

| | | |
|---|---|---|
| EP | 0505737 | 2/1992 |
| WO | WO 97/31071 | * 8/1997 |

* cited by examiner

*Primary Examiner*—Susan W. Berman
(74) *Attorney, Agent, or Firm*—Renner, Otto, Boisselle & Sklar, LLP

(57) ABSTRACT

This invention relates to a curable coating composition which comprises: (A) a compound represented by the formula

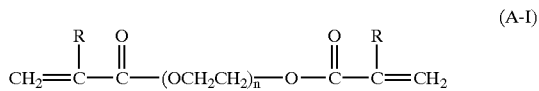

(A-I)

wherein in formula (A-I) each R independently is hydrogen or a hydrocarbyl group of 1 to about 8 carbon atoms, and n is a number that is about 4 or higher; and (B) a reactive vinyl or unsaturated monomer or oligomer, provided said reactive vinyl or unsaturated monomer or oligomer is not the same as (A). In one embodiment the inventive composition further comprises (C) a photoinitiator. In one embodiment, the inventive composition further comprises (D) a thermal initiator. In one embodiment, the inventive composition further comprises (E) a latent acid catalyst. The invention also relates to a method of coating a substrate utilizing the foregoing coating composition, as well as to a substrate coated in accordance with foregoing method. The invention also relates to composite articles comprised of a substrate with a cured printable coating derived from the foregoing composition adhered to a surface of said substrate.

26 Claims, No Drawings

COATING COMPOSITION COMPRISING ETHOXYLATED DIACRYLATES

TECHNICAL FIELD

This invention relates to coating compositions. More particularly, this invention relates to coating compositions which may be applied to substrates such as polymeric films to improve their printability and other surface characteristics.

BACKGROUND OF THE INVENTION

Polymeric films generally are smooth and have low surface tensions due to their inherent characteristics. Printing on untreated films often results in unsatisfactory print quality due to insufficient surface wetting and insufficient ink adhesion. There is also the possibility of surface contaminants on film surfaces which can further reduce print quality.

Various coatings have been applied to the surfaces of polymeric films to improve their printability. The improved ink performance of such coated films may be due to improved surface tension, altered polarity; different degrees of micro-roughness, or other physical or chemical factors.

A problem in the art relates to the fact that the coating compositions currently available for improving ink adhesion have been found to be less than satisfactory for many inks, including water-based flexo inks. Another problem relates to the fact that many of these coating compositions are inadequate for beverage container applications due to the fact that the ink adhesion provided by such coatings is inadequate when subjected to standard water-soak beverage test procedures. Still another problem relates to the fact that many of these coatings are inadequate due to the fact that they exhibit inadequate chemical resistance properties. The present invention overcomes these problems by providing, in one embodiment a coating that provides enhanced adhesion for a wide variety of inks, including water-based flexo inks, and in one embodiment a coating that exhibits enhanced water-soak beverage characteristics, and in one embodiment a coating that exhibits enhanced chemical resistance characteristics.

U.S. Pat. No. 5,804,301 discloses a radiation-curable coating composition which comprises (A) from about 70% to about 99% by weight of at least one polyfunctional acrylate monomer containing at least one internal flexible unit; (B) from about 1% to about 30% by weight of at least one other reactive vinyl or unsaturated monomer provided the reactive vinyl or unsaturated monomer (B) is not the same as the monomer of (A); and (C) from about 0% to about 10% by weight of at least one photoinitiator, provided that the composition is free of methacrylic functionalized colloidal silica. A method of coating a substrate utilizing the foregoing radiation-curable compositions, as well as a substrate coated in accordance such method are also disclosed.

SUMMARY OF THE INVENTION

This invention relates to a curable coating composition which comprises: (A) a compound represented by the formula

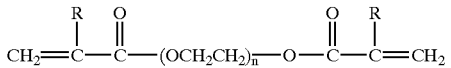

(A-I)

wherein in formula (A-I) each R independently is hydrogen or a hydrocarbyl group of 1 to about 8 carbon atoms, and n is a number that is about 4 or higher; and (B) a reactive vinyl or unsaturated monomer, provided said reactive vinyl or unsaturated monomer is not the same as (A). In one embodiment, the inventive composition further comprises (C) a photoinitiator. In one embodiment, the inventive composition further comprises (D) a thermal initiator. In one embodiment, the inventive composition further comprises (E) a latent acid catalyst. The invention also relates to a method of coating a substrate utilizing the foregoing coating composition, as well as to a substrate coated in accordance with foregoing method. The invention also relates to composite articles comprised of a substrate with a cured printable coating derived from the foregoing composition adhered to a surface of said substrate.

DETAILED DESCRIPTION OF THE PREFERRED EMBODIMENTS

Component (A) of the inventive coating composition is a compound represented by the formula

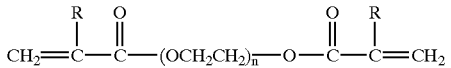

(A-I)

wherein in formula (A-I) each R independently is hydrogen or a hydrocarbyl group of 1 to about 8 carbon atoms, and n is a number that is about 4 or higher, and in one embodiment about 6 or higher. The hydrocarbyl groups include aliphatic groups, especially alkyl and alkenyl groups. In one embodiment, the hydrocarbyl groups are alkyl groups. In one embodiment, each R independently is hydrogen or a hydrocarbyl group of 1 to about 4 carbon atoms, and in one embodiment 1 or 2 carbon atoms. In one embodiment, each R independently is hydrogen or methyl. In one embodiment, each R is hydrogen. In one embodiment, each R is methyl. In one embodiment, n is a number in the range of about 4 to about 30, and in one embodiment about 6 to about 30, and in one embodiment about 8 to about 30, and in one embodiment about 8 to about 20, and in one embodiment about 8 to about 6. In one embodiment, n is in the range of about 8 to about 10, and in one embodiment it is in the range of about 12 to about 15. Examples include polyethylene glycol (number average molecular weight (Mn)=600) diacrylate, polyethylene glycol (Mn=400) diacrylate, polyethylene glycol (MN=200) diacrylate.

These compounds may be prepared by procedures well known to those skilled in the art. One method of preparing such compounds involves condensing ethylene glycol to form ether linkages and thereafter reacting the intermediate ether with sufficient acrylic or methacrylic acid, or esters or derivatives thereof to form the desired compound.

The inventive coating compositions also contain (B) a reactive vinyl or unsaturated monomer or oligomer, provided that the reactive vinyl or unsaturated monomer or oligomer is not the same as component (A). The reactive vinyl or unsaturated monomers (B) that are useful include vinyl ethers, mono- and polyfunctional acrylate monomers or oligomers, vinyl esters, vinyl carboxylic acids, vinyl carboxylic acid salts, vinyl amides, and unsaturated dicarboxylic acids and derivatives thereof such as maleic and fumaric acids and derivatives thereof. In one embodiment, component (B) is selected from the group consisting of vinyl ethers, mono- or polyfunctional acrylate monomers or oligomers, and mixtures of two or more thereof. In one embodiment, component (B) is at least one vinyl ether and is free of any mono- or polyfunctional acrylate monomers or oligomers.

Various vinyl ethers may be included in the coating compositions of the present invention as component (B), and these include ethers containing one or more vinyl groups. Specific examples of useful vinyl ethers include ethyl vinyl ether, butyl vinyl ether, hydroxy butyl vinyl ether, cyclohexyl vinyl ether, 2-ethylhexyl vinyl ether, octyl vinyl ether, decyl vinyl ether, dodecyl vinyl ether, octadecyl vinyl ether, cyclohexane dimethanol monovinyl ether, phenyl vinyl ether, 1,6-hexanediol divinyl ether, 1,4-cyclohexane dimethanol divinyl ether, diethylene glycol divinyl ether, triethylene glycol divinyl ether, tetraethylene glycol divinyl ether, dipropylene glycol divinyl ether, tripropylene glycol divinyl ether, tetrapropylene glycol divinyl ether, and the propenyl ether of propylene carbonate. Ethers with more than one vinyl group such as 1-hexanediol divinyl ether, 1,4-cyclohexane dimethanol divinyl ether, diethylene glycol divinyl ether, triethylene glycol divinyl ether, tetraethylene glycol divinyl ether, dipropylene glycol divinyl ether, tripropylene glycol divinyl ether and tetrapropylene glycol divinyl ether may be used. Diethylene glycol divinyl ether, triethylene glycol divinyl ether, dipropylene glycol divinyl ether and tripropylene glycol divinyl ether are useful. Vinyl ethers available from International Specialty Products, Wayne, N.J., under the trade designation Rapi-Cure may be used.

Examples of suitable polyfunctional acrylate monomers and oligomers useful as component (B) include the following types of acrylates:

aliphatic polyether urethane acrylates, diacrylates and polyacrylates;

aliphatic polyester urethane acrylates, diacrylates and polyacrylates;

aromatic polyether urethane acrylates, diacrylates and polyacrylates;

aromatic polyester urethane acrylates, diacrylates and polyacrylates;

polyester acrylates, diacrylates and polyacrylates;

polyether acrylates, diacrylates and polyacrylates;

epoxy acrylates, diacrylates and polyacrylates;

polyamine acrylates, diacrylates and polyacrylates; and acrylated acrylic oligomers.

Polyfunctional acrylate monomers and oligomers that are useful as component (B) are available commercially from a variety of sources. Urethane acrylate oligomers are available from Morton Thiokol under the designations Uvithane 782 and Uvithane 783, and from Polymer Systems Corp., Orlando, Fla. under the designation PURELAST. Ebecryl 270 is an acrylated aliphatic urethane oligomer available from UCB Radcure, Atlanta, Ga. Epoxy acrylate oligomers are available, for example, from UCB Radcure, Atlanta, Ga. under the designations Novacure® 3600 and from Shell Chemical Company under the designation Epocryl 25A60. Although Epocryl 25A60 contains some volatile solvent, the product can be mixed with an acrylate monomer such as, for example, 1,6-hexanediol diacrylate, and the solvent originally present can be removed. An example of a commercially available acrylic acrylate oligomer is Novacure 6700 from UCB Radcure. An example of a commercially available polyamine acrylate oligomer is Novacure 7100 from UCB Radcure. This acrylate functional oligomeric amine is a liquid having a viscosity in the range of 500 to 1500 CPS at 25° C. and a theoretical molecular weight of 800, and the oligomer contains less than 10% of hexanediol diacrylate.

Examples of mono- and polyfunctional acrylate monomers which may be utilized as component (B) in the coating compositions of the present invention include one or more of the following: ethylhexyl acrylate; 2-ethoxyethyl acrylate; cyclohexyl acrylate; lauryl acrylate; stearyl acrylate; alkoxylated phenol acrylates; alkoxylated nonylphenol acrylates; nonylphenol acrylate; isobornyl acrylate; acrylated epoxy soya oil; acrylated epoxy linseed oil; caprolactone acrylate; 2-phenoxyethyl acrylate; benzyl acrylate; monomethoxy tripropylene glycol monoacrylate; monomethoxy neopentyl glycol propoxylate monoacrylate; 1,3-butanediol diacrylate; 1,4-butanediol diacrylate; 1,6-hexanediol diacrylate; trimethylolpropane triacrylate; glyceryl triacrylate; pentaerythritol triacrylate; pentaerythritol tetraacrylate; dipentaerythritol pentaacrylate; di-trimethyl-olpropane tetraacrylate; tris (2-hydroxyethyl)isocyanurate triacrylate, tetrahydrofurfuryl acrylate; isooctyl acrylate; isodecyl acrylate; 2-(2-ethoxyethoxy)ethyl acrylate; ethylene glycol diacrylate; propylene glycol diacrylate; neopentyl glycol diacrylate; cyclopentenyl oxyethyl acrylate; 9-anthracenyl methyl acrylate; 1-pyrenylmethyl acrylate; fluorescein diacrylate; and 3,8-diacryloyl ethidium bromide.

Acrylate monomers and oligomers are generally preferred over methacrylate monomers and oligomers because of higher cure speed. Difunctional and polyfunctional acrylate monomers and oligomers are generally preferred for higher cure speed. Generally, the acrylate monomers and oligomers with higher molecular weights are preferred due to lower volatility and lower odor. As the molecular weight is increased, however, there is generally an increase in viscosity so that the upper limit of molecular weight for monomers and oligomers may be determined based on viscosity considerations. A low overall viscosity generally is desired for fast wetout and coating at high speeds. The monomers and oligomers useful as component (B) may have calculated molecular weights from about 150 to about 15,000, and in one embodiment about 300 to about 5,000 or 10,000, and in one embodiment from about 300 to about 3,000. The molecular weight is either a calculated molecular weight based on the sum of the atomic weights of the atoms making up the monomer or oligomer, or the molecular weight is a number average molecular weight (Mn) which may be determined by end group analysis.

Examples of vinyl esters include vinyl propionate, vinyl acetate, vinyl 2-ethyl hexanoate, etc.

In one embodiment, component (B) is a compound represented by the formula

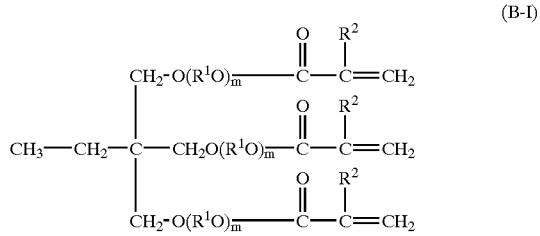

(B-I)

wherein in formula (B-I) each $R^1$ independently is a hydrocarbylene group of 1 to about 3 carbon atoms, each $R^2$ independently is hydrogen or methyl, and each m independently is a number in the range of 1 to about 30. The hydrocarbylene groups include alkylene groups. The hydrocarbyl groups include alkyl groups. In one embodiment, each $R^1$ independently has 2 or 3 carbon atoms. In one embodiment, each $R^2$ independently is hydrogen or methyl. In one embodiment, each m independently is from about 1 to about 20. In one embodiment, each $R^1$ has 2 carbon atoms, each $R^2$ is hydrogen, and each m is a number in the range of about 1 to about 6, and in one embodiment each m is 1. An example of a commercially available material that may be used is ethoxylated₃ trimethyol propane triacrylate which is available from Sartomer Co. under the trade designation SR 454. The term "ethoxylated₃" refers to the fact that the compound has 3 ethoxy groups. Thus, in referring to formula (B-I), for SR 454 each $R^1$ is $C_2H_4$, each $R^2$ is H, and each m is 1.

The inventive coating compositions may contain from about 30 to about 95% by weight of component (A), and in one embodiment about 30 to about 80% by weight, and in one embodiment about 50 to about 70% by weight of component (A). These coating compositions may contain from about 5 to about 70% by weight of component (B), and in one embodiment about 5 to about 50% by weight, and in one embodiment about 15 to about 30% by weight of component (B).

In one embodiment, the coating compositions of the present invention are radiation-curable, and thus, these coating compositions may contain from 0% to about 10%, and in one embodiment from 0% to about 8% by weight, and in one embodiment about 3% by weight to about 7% by weight, and in one embodiment about 5% by weight of (C) at least one photoinitiator. A photoinitiator is not required when the coating compositions are to be cured by electron beam (EB) processes. A photoinitiator is necessary when the compositions are to be cured by ultraviolet (UV) or visible light. Photoinitiators are classified in two major groups based upon a mode of action. Cleavage-type photoinitiators include acetophenones, benzoin ethers, benzoyl oximes and acyl phosphines. Abstraction-type photoinitiators include benzophenone, Michler's ketone, thioxanthones, anthraquinone, camphorquinone and ketocoumarin. Abstraction-type photoinitiators function better in the presence of materials such as amines and other hydrogen donor materials added to provide labile hydrogen atoms for abstraction. In the absence of such added materials, photoinitiation may still occur via hydrogen abstraction from monomers, oligomers or other components of the system.

Examples of photoinitiators which may be used include one or more of the following:
benzophenone
benzyldimethyl ketal
isopropylthioxanthone
bis(2,6-dimethoxybenzoyl)(2,4,4-trimethylpentyl) phosphine oxide
2-hydroxy-2-methyl-1-phenyl-1-propanone
diphenyl(2,4,6-trimethybenzoyl)phosphine oxides
1-hydroxycyclohexyl phenyl ketone
2-benzyl-2-(di-methylamino)-1-[4-(4-morpholinyl) phenyl]-1-butanone
α,α-dimethoxy-α-phenylacetophenone
2,2-diethoxyacetophenone
2-methyl-1-[4-(methylthio)phenyl]-2-(4-morpholinyl)-1-propanone
2-hydroxy-1-[4-(hydroxyethoxy)phenyl]-2-methyl-1-propanone In one embodiment, combinations of photoinitiators are used to achieve improved surface and through cure of coating compositions. Reactive photoinitiators, which contain polymerizable groups, may also be used in order to react the photoinitiator molecules into the cross-linked polymer matrix. In one embodiment, the photoinitiators are used in the least amount necessary to get initiation of cure at the line speed of the process. The cure process is generally more efficient in the absence of oxygen, for example, in the presence of nitrogen, so a greater amount of photoinitiator is generally required in the presence of oxygen.

Examples of hydrogen donor materials which may be utilized in combination with photoinitiators include, but are not limited to, one or more of the following:
ethyl-4-dimethylaminobenzoate
octyl-p-(dimethylamino)benzoate
N-methyldiethanolamine
dimethylethanolamine
triethanolamine
tri-n-propylamine
diethylethanolamine
triethylamine
diisopropylethylamine
diisopropylethanolamine
dimethylaminomethylphenol
tris(dimethylaminomethyl)phenol
benzyldimethylamine
amine acrylates
amine methacrylates Any appropriate type of lamp, for example, mercury vapor, pulsed xenon, or electrodeless, may be used for UV curing. Choice of photoinitiator or photoinitiator combinations, with characteristic absorbance spectra, should be matched with the spectral output of the bulb, for example, H bulb, D bulb, Q bulb, or V bulb, for highest curing efficiency.

In one embodiment, the inventive coating composition further comprises (D) a thermal initiator. The thermal initiators used herein include free radical initiators selected from substituted or unsubstituted pinacols, azo compounds, thiurams, organic peroxides and mixtures thereof.

The organic peroxides may be represented by the general formula:

$$R-O-O-(R^1-O-O)_n-R \quad \text{(D-I)}$$

wherein in formula (D-I), n is zero or one, each R independently is selected from hydrogen, aryl, alkyl, aryl carbonyl, alkaryl carbonyl, aralkyl carbonyl and alkyl carbonyl of about 1 to about 15 carbon atoms, and each $R^1$ independently is alkylene or aryl, said alkylene or aryl groups containing 1 to about 10 carbon atoms. Examples include 2,5-dimethyl-2,5-di(t-butylperoxy)-hexane, 1,3-bis(t-butylperoxyisopropyl)benzene, 1,3-bis-(cumylperoxyisopropyl)benzene, 2,4-dichlorobenzoyl peroxide, caprylyl peroxide, lauroyl peroxide, t-butyl peroxyisobutyrate, benzoyl peroxide, p-chlorobenzoyl peroxide, hydroxyheptyl peroxide, di-t-butyl diperphthalate, t-butyl peracetate, t-butyl perbenzoate, dicumyl peroxide, 1,1-di(t-butylperoxy)-3,3,5-trimethylcyclohexane and di-t-butyl peroxide.

Examples of azo compounds include 2-t-butylazo-2-cyanopropane; 2,2'-azobis-(2,4-dimethyl-4-methoxy-valeronitrile); 2,2'-azobis-(isobutyronitrile); 2,2'-azobis(2,4-dimethylvaleronitrile); and 1,1'-azobis (cyclohexanecarbonitrile).

The thiurams include those compounds represented by the formula:

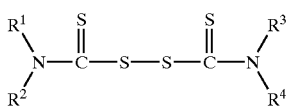
(D-II)

wherein in formula (D-II), $R^1$, $R^2$, $R^3$ and $R^4$ taken singly may be hydrogen, linear or branched alkyl having from 1 to about 12 carbon atoms, linear or branched alkenyl having from 2 to about 12 carbon atoms, cycloalkyl having from 3 to about 10 ring carbon atoms, cycloalkenyl having from 3 to about 10 ring carbon atoms, aryl having from 6 to about 12 ring carbon atoms, alkaryl having from 6 to about 12 ring carbon atoms, aralkyl having from 6 to about 12 ring carbon atoms and, when taken together, $R^1$ and $R^2$ and $R^3$ and $R^4$ can each be a divalent alkylene group (—$C_nH_{2n}$—) having from 2 to about 12 carbon atoms, a divalent alkenylene group (—$C_nH_{2n-2}$—) group having from 3 to about 10 carbon atoms, a divalent alkadienylene group (—$C_nH_{2n-4}$—) having from 5 to about 10 carbon atoms, a divalent alkatrienylene group (—$C_nH_{2n-6}$—) having from 5 to about 10 carbon atoms, a divalent alkyleneoxyalkylene group (—$C_xH_{2x}OC_xH_{2x}$—) having a total of from 4 to about 12 carbon atoms or a divalent alkyleneaminoalkylene group:

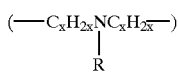

having a total of from 4 to about 12 carbon atoms. The thiurams include tetramethylthiuram disulfide, tetraethylthiuram disulfide, di-N-pentamethylenethiuram disulfide, tetrabutylthiuram disulfide, diphenyldimethylthiuram disulfide, diphenyl-diethylthiuram disulfide, diethyleneoxythiuram disulfide and the like.

The substituted or unsubstituted pinacols may be represented by the general formula:

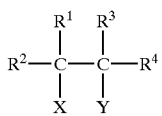
(D-III)

wherein in formula (D-III), $R^1$ and $R^3$ are the same or different substituted or unsubstituted aromatic groups, $R^2$ and $R^4$ are substituted or unsubstituted aliphatic or aromatic groups, and X and Y which may be the same or different are hydroxyl, alkoxy or aryloxy groups.

Useful pinacols include those wherein $R^1$, $R^2$, $R^3$ and $R^4$ are aromatic groups, especially phenyl groups, and X and Y are hydroxyl. Examples include benzopinacol, 4,4'-dichlorobenzopinacol, 4,4'-dibromobenzopinacol, 4,4'-diiodobenzopinacol, 4,4',4",4"'-tetrachlorobenzopinacol, 2,4, 2',4'-tetrachlorobenzopinacol, 4,4'-dimethylbenzopinacol, 3,3'-dimethylbenzopinacol, 2,2'-dimethylbenzopinacol, 3,4,3',4'-tetramethylbenzopinacol, 4,4'-dimethoxybenzopinacol, 4,4',4",4"'-tetramethoxybenzopinacol, 4,4'-diphenylbenzopinacol, 4,4'-dichloro-4",4"'-dimethylbenzopinacol, 4,4'-dimethyl-4",4"'-diphenylbenzopinacol, xanthonpinacol, fluorenonepinacol, acetophenonepinacol, 4,4'-dimethylacetophenone-pinacol, 4,4'-dichloroacetophenonepinacol, 1,1,2-triphenyl-propane-1,2-diol, 1,2,3,4-tetraphenylbutane-2,3-diol, 1,2-diphenylcyclobutane-1,2-diol, propiophenone-pinacol, 4,4'-dimethylpropiophenone-pinacol, 2,2'-ethyl-3,3'-dimethoxypropiophenone-pinacol, 1,1,1,4,4,4-hexafluoro 2,3-diphenyl-butane-2,3-diol. Also included are benzopinacol monomethylether, benzopinacol monophenylether, benzopinacol monoisopropyl ether, benzopinacol monoisobutyl ether, benzopinacol mono (diethoxymethyl) ether and the like.

The thermal initiators (D) are usually added in amounts ranging up to about 10% by weight based on the overall weight of the inventive coating composition, and in one embodiment from about 3 to about 5% by weight.

In one embodiment, the inventive coating compositions further comprise (E) a latent acid catalyst. The term "latent acid catalyst" is used herein to refer to a catalyst that is blocked until heat or light liberates free acid. These catalysts provide enhanced storage stability of the inventive coating composition for a relatively long period of time, promote the curing reaction when the composition is cured in a short time at a rather low temperature, and provide enhanced chemical properties and physical properties to the cured coatings. The latent acid catalyst may be a compound which exhibits catalytic activity at temperatures above about 50° C., and in one embodiment in the range of about 65 to about 150° C.

Examples of useful latent acid catalysts (E) are compounds prepared by neutralizing Bronsted acids or Lewis acids with Lewis bases, complex compounds formed from Lewis acids and Bronsted acids, complex compounds formed from Lewis acids and Bronsted salts, esters of sulfonic acids, esters of at phosphoric acid, and onium compounds.

The Bronsted acid may be a substance showing acidity with dissociation of proton. These include sulfuric acid, sulfonic acid, phosphoric acid, boric acid, carboxylic acids and derivatives thereof.

Examples of the Bronsted acids include sulfuric acid, monoesters of sulfuric acid, phosphoric acid, monoesters and diesters of phosphoric acid, esters of polyphosphoric acid, monoesters and diesters of boric acid, sulfonic acids, carboxylic acids, halogenocarboxylic acids and the like. Included are alkylbenzenesulfonic acids having 1 to about 50 carbon atoms, such as dodecylbenzenesulfonic acid and the like; mono- or dihalogenocarboxylic acids, such as chloroacetic acid, dichloroacetic acid and the like; alkyl monoesters and diesters of phosphoric acid having 1 to about 50 carbon atoms, such as monomethyl phosphate, dimethyl phosphate and the like. The Bronsted acid may be utilized singly or as a combination of two or more kinds.

The Lewis acid is a compound having the property of accepting electrons. In one embodiment, the Lewis acid is a metal halide or a organometallic compound having the formula:

$$(R)_n—M \qquad (E\text{-}I)$$

wherein in formula (E-I), R is a halogen atom or one or more kinds of organic groups selected from the group consisting of alkyl groups, aryl groups, alkoxy groups and acyloxy groups of 1 to about 20 carbon atoms and a carbonyl group adjacent to an active methylene group, M is B, Mg, Al, Ca, Sn, Pb or a transition metal atom belonging to one of the 3A group to the 7A group, the 8 group, the 1B group and the 2B group in the fourth to the sixth period of the long Periodic Table, and n is an integer in the range from 1 to about 6. The metals forming the Lewis acid in the long Periodic Table described above are classified according to the method of nomenclature of inorganic chemistry by IUPAC in 1988.

Examples of the Lewis acid include metal halides, such as boron trifluoride, aluminum trichloride, titanium trichloride, titanium tetrachloride, ferrous chloride, ferric chloride, zinc chloride, zinc bromide, stannous chloride, stannic chloride, stannous bromide, stannic bromide and the like; organometallic compounds, such as trialkylboron, trialkylaluminum, dialkylaluminum halides, monoalkylaluminum halides, tetraalkyltin, aluminum acetylacetonate, iron acetylacetonate, zirconium acetylacetonate, dibutyltin acetylacetonate, dibutyltin dilaurate, dioctyltin ester maleate, magnesium naphthenate, calcium naphthenate, manganese naphthenate, iron naphthenate, cobalt naphthenate, copper naphthenate, zinc naphthenate, zirconium naphthenate, lead naphthenate, calcium octanoate, manganese octanoate, iron octanoate, cobalt octanoate, zinc octanoate, zirconium octanoate, tin octanoate, lead octanoate, zinc laurate, magnesium stearate, aluminum stearate, calcium stearate, cobalt stearate, zinc stearate, lead stearate and the like, and other like compounds. The Lewis acid may be utilized singly or as a combination of two or more kinds.

The Lewis base utilized for neutralizing the Bronsted acid or the Lewis acid is a compound having the property of donating electrons. Examples of the Lewis base include amines, such as ammonia, triethylamine, pyridine, aniline, morpholine, N-methylmorpholine, pyrrolidine, N-methylpyrrolidine, piperidine, N-methylpiperidine, cyclohexylamine, n-butylamine, dimethyloxazoline, imidazole, N-methylimidazole, N,N-dimethylethanolamine, N,N-diethylethanolimine, N,N-dipropylethanolamine, N,N-dibutylethanolamine, N,N-dimethylisopropanolamine, N,N-diethylisopropanolamine, N,N-dipropylisopropanolamine, N,N-dibutylisopropanolamine, N-methyldiethanolamine, N-ethyldiethanolamine, N-propyldiethanolamine, N-butyldiethanolamine, N-methyldiisopropanolamine, N-ethyldiisopropanolamine, N-propyldiisopropanolamine, N-butyldiisopropanolamine, triethylamine, triisopropanolamine, tri-s-butanolamine and the like; amides, such as N,N-dimethylformamide, N,N-dimethylacetamide, N-methylpyrrolidone, hexamethylphosphoric acid triamide and the like; sulfoxide compounds, such as dimethylsulfoxide and the like; ethers, such as diethylether, tetrahydrofuran and the like; thioethers, such as dimethylsulfide and the like; esters of phosphoric acid, such as trimethyl phosphate, triethylphosphate, tributyl phosphate and the like; esters of boric acid, such as trimethyl borate and the like; esters of carboxylic acids, such as ethyl acetate, butyl acetate and the like; esters of carbonic acid, such as ethylene carbonate and the like; trialkylphosphines, such as tributylphosphine and the like; and like other compounds.

In the latent acid catalyst obtained by neutralizing the Bronsted acid or the Lewis acid with the Lewis base, the ratio of the basic activity of the Lewis base to the acidic activity of the acid is generally in the range from about 0.1 to about 10. When the ratio is less than about 0.1, the catalytic activity of the acid may not be sufficiently suppressed during storage and, when the ratio is more than about 10, the catalytic activity of the acid tends to be decreased.

The esters of sulfonic acids utilized as the latent acid catalyst (E) may be compounds having the formula

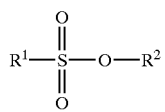

(E-II)

wherein in formula (E-II), $R^1$ is selected from the group consisting of phenyl group, substituted phenyl group, naphthyl group, substituted naphthyl group and alkyl group, and $R^2$ is a group of about 3 to about 18 carbon atoms bonded with sulfonyloxy group through a primary or secondary carbon atom which is selected from the group consisting of alkyl group, alkenyl group, aryl group, alkaryl group, alkanol group, saturated or unsaturated cycloalkyl group and saturated or unsaturated hydroxycycloalkyl group. Examples include esters of sulfonic acids, such as methane sulfonic acid, ethane sulfonic acid, benzene sulfonic acid, dodecylbenzene sulfonic acid, naphthalene sulfonic acid, nonylnaphthalene sulfonic acid and other like sulfonic acids, with primary alcohols, such as n-propanol, n-butanol, n-hexanol, n-octanol and the like, or secondary alcohols, such as isopropanol, 2-butanol, 2-hexanol, 2-octanol, cyclohexanol and the like, and β-hydroxyalkylsulfonic esters prepared by the reaction of the sulfonic acids and compounds containing oxirane group.

The esters of phosphoric acid include compounds having the formula

(E-III)

wherein in formula (E-III), R is an alkyl group, cycloalkyl group or aryl group of up to about 10 carbon atoms, and m is 1 or 2. Examples include monoesters and diesters of phosphoric acid with primary alcohols, such as n-propanol, n-butanol, n-hexanol, n-octanol, 2-ethylhexanol and the like, or secondary alcohols, such as isopropanol, 2-butanol, 2-hexanol, 2-octanol, cyclohexanol and the like, and β-hydroxyester compounds obtained by reaction of phosphoric acid with oxirane compounds.

The onium compounds may be compounds having one of the formulas

(E-IV)

(E-V)

(E-VI)

(E-VII)

wherein each $R^1$ independently is an alkyl group, alkenyl group, aryl group, alkaryl group, alkanol group or cycloalkyl group of up to about 12 carbon atoms; two $R^1$ groups may be bonded together to form a heterocyclic ring in which N, P, O or S is the hereto atom; $R^2$ is a hydrogen atom or an alkyl group, alkenyl group, aryl group or alkaryl group of up to about 12 carbon atoms; and X is selected from the group consisting of $SbF_6^-$, $AsF_6^-$, $PF_6^-$ and $BF_4^-$. An example of a commercially available onium compound which may be used as the latent acid catalyst (E) is UV-6974, which is a product of Union Carbide identified as a triaryl sulfonium hexafluroantimonate salt.

The concentration of the latent acid catalysts (E) in the inventive coating composition may range up to about 10% by weight, and in one embodiment about 2 to about 5% by weight, and in one embodiment about 3% by weight, based on the overall weight of the coating composition.

In addition to the above-described components, the inventive coating compositions may include other additives known to those skilled in the art. These include pigments, fillers, fluorescent additives, flow and leveling additives, wetting agents, surfactants, antifoaming agents, rheology modifiers, stabilizers, antioxidants, and the like.

Examples of pigments and filler materials include, but are not limited to, titanium dioxide, hydrophilic silica, hydrophobic amorphous fumed silica, amorphous precipitated silica, carbon black, and polymer powders. Examples of flow and leveling additives, wetting agents, and antifoaming agents include silicones, modified silicones, silicone acrylates, hydrocarbons, fluorine-containing compounds, and non-silicone polymers and copolymers such as copolyacrylates.

Examples of stabilizers include, but are not limited to:

tetrakis[methylene(3,5-di-tert-butyl-4-hydroxyhydrocinnamate)]methane;

thiodiethylene bis(3,5-di-tert-butyl-4-hydroxyhydrocinnamate);

octadecyl 3,5-di-tert-butyl-4-hydroxyhydro-cinnamate;

bis(1,2,2,6,6-pentamethyl-4-piperidinyl)sebacate;

methyl (1,2,2,6,6-pentamethyl-4-piperidinyl)sebacate; and decanedioic acid, bis(2,2,6,6-tetramethyl-4-piperidinyl) ester, reaction products with 1,1-dimethylethylhydroperoxide and octane.

The inventive coating compositions may be prepared by mixing the above-described components. The components may be mixed at room temperature with stirring, and mild heating may be employed in some instances to facilitate mixing. Since the components of the composition may undergo some separation during storage, mild agitation or mixing just prior to use may be used to redisperse the components.

The inventive coating compositions exhibit improved adhesion to substrates such as polymeric films, paper substrates, metallic or metallized films, pressure-sensitive adhesive films, and paper constructions. The coating compositions also may be used as ink binders and overprint varnishes. The inventive coating compositions may impart improved ink adhesion, chemical resistance, moisture resistance, temperature resistance and/or weathering resistance to the substrates.

The inventive coating compositions may be applied to various substrates as a coating by any conventional means known in the coating art such as by roller coating, brushing, spraying, reverse roll coating, dipping, offset gravure, etc. The coating compositions of the present invention may be heated or cooled to facilitate the coating process and to alter the depth or penetration of the coating into the substrate prior to curing.

The amount of the inventive coating composition applied to one surface of a substrate may be varied depending upon the characteristics of the substrate, the characteristics desired to be imparted to the substrate, and the particular formulation of the composition. For economic reasons, it is normally desired to apply the lowest amount of coating needed to obtain the desired results. Typically, the applied coating weights may, depending on the substrate and intended use, range from about 0.1 to about 25 grams/m$^2$. In one embodiment, applied coating weights may range from about 0.5 to about 1.5 grams/m$^2$. At these levels, the coated substrate may be characterized as having increased dimensional stability, increased strength, increased thermal stability, increased resistance to solvents and moisture, and/or improved printability.

In one embodiment, the inventive coating compositions are radiation curable compositions. These coating compositions may be cured by exposure to known forms of ionizing or actinic non-ionizing radiation. Useful types of radiation include visible light, ultraviolet light, electron beam, x-ray, gamma-ray, beta-ray, etc. As noted above, if visible light or ultraviolet light is to be used as the form of radiation, a photoinitiator such as those described above is included in the curable coating composition. Photoinitiators are not required for electron beam curing. One of the advantages of using radiation to effect curing of the composition is that polymerization takes place rapidly at ambient temperature, and heating is not necessary. The equipment for generating these forms of radiation are well known to those skilled in the art.

In one embodiment, the inventive coating compositions may be thermally cured at temperatures in the range of about 65 to about 200° C., and in one embodiment about 90 to about 170° C., for about 10 to about 60 minutes, and in one embodiment about 50 to about 30 minutes. The equipment that may be used for thermally curing these compositions are well known in the art.

Curing of the coating composition may be effected in a continuous manner by passing the coated substrate through radiation or heating equipment which is designed to provide the coated substrate with sufficient residence time to completely cure the coating. Curing may be effected at or near atmospheric pressure or in an inert atmosphere such as nitrogen or argon. The length of exposure necessary to cure the coating compositions varies with such factors as the particular formulation used, the type and wavelength of radiation, dosage rate, temperature, the atmosphere, energy flux, concentration of photoinitiator or thermal initiator, and the thickness of the coating. For electron beam curing, dosage rates of from 0.1 to about 10 megarads, generally below 4 megarads, provide the desirable curing. For UV curing, dosage rates of generally 100–500 milli Joules provide the desired curing. Generally, for radiation curing the exposure is quite brief and curing is completed in less than about 0.001 to about 0.1 seconds. The actual curing time required to give proper curing for various coatings can be readily determined by one skilled in the art with a minimum of experimentation.

Multilayered composites or composite laminates may be prepared in accordance with the present invention, and said multilayered composites comprise (A) a substrate;

(B) a cured printable coating bonded to one surface of said substrate, said coating being derived from the inventive coating composition described above; and (C) an adhesive on the other surface of said substrate.

The substrate which is included in the multilayered composite of the present invention may be any substrate material such as paper, polymeric films in the form of sheets and strips, etc. In one embodiment, the substrate is a polymeric film. In one embodiment, the substrate is a polymeric film formed from a thermoplastic material such as a polyolefin, a polycarbonate, a polyester, etc.

The composite laminates may be prepared by coating one surface of the substrate with the inventive coating composition using the procedures and in the amounts described above. After application of the coating composition to the substrate, the coating is cured using the procedures described above.

Following the application of the inventive coating composition to one surface of the substrate, an adhesive coating may be applied to the other surface of the substrate. The adhesive may be applied to the other surface either before or after the curable coating on the other surface has been cured. In one embodiment, the curable coating is cured before the adhesive is applied to the other surface of the substrate.

The amount of adhesive applied to the other surface of the substrate may range from about 1 to about 100 grams/m$^2$, and in one embodiment, the amount is in the range of from about 15 to about 45 grams/m². Although any suitable adhesive may be used including hot melt and pressure-sensitive adhesives, in one embodiment, the adhesive is a pressure-sensitive adhesive. Any adhesive may be applied to the substrate which forms an aggressive adhesive bond to the substrate and to any other surface to which the substrate is to be adhered.

Any pressure-sensitive adhesive known in the art may be used in preparing the composites of the present invention, and pressure-sensitive adhesive compositions are described in, for example, "Adhesion and Bonding," *Encyclopedia of Polymer Science and Engineering*, Vol. 1, pp. 476–546, Interscience Publishers, 2d Edition, 1985, the disclosure of which is hereby incorporated by reference. Such compositions generally contain an adhesive polymer such as natural, reclaimed or styrene butadiene rubber, tackified natural and synthetic rubbers, styrene-butadiene or styrene-isoprene block copolymers, random copolymers of ethylene and vinyl acetate, ethylene-vinyl-acrylic terpolymers, polyisobutylene, poly(vinyl ether), poly(acrylic)ester, etc., as a major constituent. Other materials may be included in the pressure-sensitive adhesive composition such as resin tackifiers including, for example, rosin esters, oil-soluble phenolics or polyterpenes; antioxidants; plasticizers such as mineral oil or liquid polyisobutylenes; and fillers such as zinc oxide or hydrated alumina. The selection of the pressure-sensitive adhesive to be used in any composites of the invention is not critical to this invention, and those skilled in the art are familiar with the many suitable pressure-sensitive adhesives for particular applications.

The multilayered composites or composite laminates of the present invention may be prepared in various forms including webs which may be in roll form and which can thereafter be cut or slit into strips or sheets of desired dimensions. The order in which the inventive coating composition and the adhesive coating are applied to the substrate is not critical. In one embodiment, the inventive coating composition is applied to one surface of the substrate, and the adhesive is thereafter applied to the other surface of the substrate followed by curing of the coating composition. In another embodiment, the inventive coating composition is applied to one surface of the substrate and cured. Thereafter, an adhesive is applied to the other surface of the substrate. The adhesive may be applied to the substrate soon after the coating has been cured, or the adhesive can be applied at a much later time such as just prior to use. In one embodiment, the curable coating can be applied after the adhesive is applied.

The substrates which are coated with the inventive coating compositions and the multilayered composites in which a substrate is coated with the inventive coating compositions may be characterized as having improved ink adhesion, chemical resistance, moisture resistance, temperature resistance and/or weathering resistance. The inventive coating compositions are particularly well-suited for providing improved adhesion of inks.

The following examples illustrate the inventive coating compositions. Unless otherwise indicated, in the following examples as well as throughout the specification and in the appended claims, all parts and percentages are by weight, all temperatures are in degrees celsius and pressures are at or near atmospheric pressure.

In the following examples, the commercial materials identified below are used.

| Tradename | Chemical | Supplier |
|---|---|---|
| SR 610 | Polyethylene glycol (600) diacrylate | Sartomer Co. |
| SR 344 | Polyethylene glycol (400) diacrylate | Sartomer Co. |
| SR 259 | Polyethylene glycol (200) diacrylate | Sartomer Co. |
| SR 306 | Tripropylene glycol diacrylate | Sartomer Co. |
| SR 454 | Ethoxylated$_3$ trimethylol propane triacrylate | Sartomer Co. |
| Ebecryl 8402 | Aliphatic urethane diacrylate oligomer | UCB-Radcure |
| Irgacure 500 | Mixture of benzophenone and 1-hydroxycyclohexyl phenyl ketone | Ciba-Geigy |
| UVI-6974 | Triaryl sulfonium hexafluroantimonate salt | Union Carbide |

In the following examples the test procedures identified below are used.

Tape Pull Test: The Tape Pull Tests are performed by placing a strip of tape across the cured ink sample. The tape is either Scotch 600, Scotch 610 or Scotch 810. A five pound weight is rolled over the sample twice. The tape is then removed with a 180° pull angle using a quick pulling action. Removal of 100% ink results is a rating of "0." Removal of little or no ink results in a rating of "5." Ratings of "5" are desirable.

Crosshatch Adhesion Test: The cured ink samples are crosshatched using a multi-tooth cutter blade. Tape Pull Tests are then performed on the crosshatched areas using the procedure described above.

EXAMPLE 1

Coating samples 1–3, and comparative coating sample C-1, are prepared using the ingredients identified in Table I below. The numerical values indicated for the ingredients in the table are in parts by weight. The coating samples are prepared by adding the ingredients to 20-gram capacity clear glass vials, capping the vials, and then agitating the samples for 10 minutes on a shaker table. The coating samples are applied to film samples and then tested for ink adhesion. The film samples are 2.0 mil samples of Labellyte LL196B2 (a product of Mobil identified as a biaxially oriented polyproplyene film having a corona-treated side). Each film sample has the dimensions of 8.5×11 inches. A 5 gram portion of Sample 1 is applied to the top edge of one of the film samples on the corona-treated side of the film. A second film sample is placed over the first film sample with the coating sample sandwiched between the film samples. The corona treated side of the second film sample contacts the coating sample. The sandwich is advanced through a two-rubber roll laminator at a rate of 0.5 inch per second and a pressure of 40 pounds per square inch to form a laminate. After lamination, the two sheets of film from the laminate are slowly peeled apart to provide two coated film samples, each coated film sample having a wet coating, the coating weight on each coated film sample being 1.5 grams per square meter. This procedure is repeated for the remaining coating samples 2, 3 and C-1. The coated film samples are cured in a Fusion UV Benchtop model curing chamber with nitrogen inerting, the oxygen concentration being less than 150 ppm. Fusion "H" bulbs are used at 55% power. The belt speed is 125 feet per minute. Samples of the following inks are applied to the coated surface of the cured coated film samples using a Parmarco Precision Hand Proofer with 180 cell, #49 anilox roll and rubber transfer roll:

(a) Blue water-based flexo ink supplied by Warnke (b) RSP19, an orange UV flexo ink supplied by Norcote Inc.

(c) UV white rotary screen ink supplied by CoatScreen Inc.

The Warnke blue samples are heated in an oven at 190° F. (87.8° C.) for 30 seconds. The Norcote orange and the CoatScreen white samples are cured using the Fusion UV Benchtop model curing chamber referred to above. A Fusion "D" bulb at 100% power with a belt speed of 50 feet per minute is used. No inerting is used for the Norcote orange samples. Inerting with oxygen at less than 150 ppm is used for the CoatScreen white samples. The samples are tested for ink anchorage using the Tape Pull Test with Scotch 600 tape. The results are indicated in Table I.

TABLE I

| Ingredients | 1 | 2 | 3 | C-1 |
|---|---|---|---|---|
| SR 610 | 55 | — | — | — |
| SR 344 | — | 55 | — | — |
| SR 259 | — | — | 55 | — |
| SR 306 | — | — | — | 55 |
| SR 454 | 30 | 30 | 30 | 30 |
| Ebecryl 8402 | 10 | 10 | 10 | 10 |
| Irgacure 500 | 5 | 5 | 5 | 5 |
| Tape Pull Results | | | | |
| Wernke Blue | 5 | 4 | 3 | 1 |
| Norcote Orange | 5 | 5 | 0 | 4.3 |
| CoatScreen White | 5 | 3.3 | 5 | 5 |

EXAMPLE 2

The coating composition disclosed below is prepared by mixing the ingredients in a stainless steel mixing tank at a temperature of 100° F. (37.8° C.). Mixing is effected using a cowls mixing blade which is attached to an air motor. The weight of the batch is 60 pounds. In the following formulation all numerical values are in parts by weight.

| SR 610 | 55 |
|---|---|
| SR 454 | 30 |
| Ebecryl 8402 | 10 |
| Irgacure 500 | 5 |

This coating composition is coated on the corona treated side of a 2.0 mil sample of Labellyte LL196B2 using a seven-roll silicone coater machine at a rate of 600 feet per minute using two banks of 600 watt Fusion "H" bulbs for a total of 1200 watts. The coating thickness is 1 gram per square meter. Nitrogen inerting is used to provide an oxygen content of less than 100 ppm. Corona treatment at 1 kw per 100 feet per minute is used. Samples of the resulting coated film samples are coated with Norcote orange ink and Werneke blue ink using the procedures described in Example 1. Samples are also coated with Akzo-Nobel #FM RP-3 Red Water Based Flevo ink and Arcar #AWK-35-1 Black Water Based Flexo ink. These samples are tested for ink anchorage using the Tape Pull Test and the Crosshatch Adhesion Test using Scotch 600, 610 and 810 tape. The results are indicated below. For each test involving Norcote Orange and Wernke Blue, the best score that is possible is "5" and the worst is "0." For the tests involving Akzo-Nobel Red and Arcar Black a different scale is used and the best score that is possible is "6" and the worst is "0."

| | Tape Pull Test | | | Crosshatch Adhesion Test | | |
|---|---|---|---|---|---|---|
| Ink | 600 | 610 | 810 | 600 | 610 | 810 |
| Norcote Orange | 5 | 5 | 5 | 5 | 5 | 5 |
| Werneke Blue | 5 | 5 | 5 | 5 | 5 | 5 |
| Akzo-Nobel Red | 6 | 6 | 6 | 6 | 6 | 6 |
| Arcar Black | 6 | 6 | 6 | 6 | 6 | 6 |

EXAMPLE 3

The coating composition disclosed below is prepared using the procedure described in Example 2. In the following formulation all numerical values are in parts by weight.

| SR 610 | 52 |
|---|---|
| SR 454 | 30 |
| Ebecryl 8402 | 10 |
| Irgacure 500 | 5 |
| UVI-6974 | 3 |

This coating composition is coated on the corona treated side of a 2.0 mil sample of Labellyte LL196B2 using the procedure described in Example 2. The resulting coated film sample is tested with a pH pen with result being a yellow color indicating an acidic surface. Samples of this coated film are coated with ink in the same manner as in Example 2 and tested for ink adhesion with the following results:

| | Tape Pull Test | | | Crosshatch Adhesion Test | | |
|---|---|---|---|---|---|---|
| Ink | 600 | 610 | 810 | 600 | 610 | 810 |
| Norcote Orange | 5 | 5 | 5 | 5 | 5 | 5 |
| Werneke Blue | 5 | 5 | 5 | 5 | 5 | 5 |
| Akzo-Nobel Red | 6 | 6 | 6 | 6 | 6 | 6 |
| Arcar Black | 6 | 6 | 6 | 6 | 6 | 6 |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A curable coating composition, comprising:

(A) a compound represented by the formula

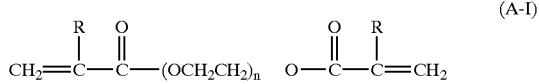

(A-I)

wherein in formula (A-I), each R is hydrogen, and n is a number that is about 8 to about 30; and (B) a reactive unsaturated monomer or oligomer, provided said reactive unsaturated monomer or oligomer is not the same as (A).

2. The composition of claim 1 wherein said composition further comprises (C) a photoinitiator.

3. The composition of claim 2 wherein said photoinitiator (C) is selected from the group consisting of acetophenones, benzoin ethers, benzoyl oximes, acyl phosphine oxides, benzophenone, Michler's ketone, thioxanthones, anthraquinone, camphorquinone, ketocoumarin, and mixtures of two or more thereof.

4. The composition of claim 2 wherein said photoinitiator (C) is benzophenone, 1-hydroxycyclohexyl phenyl ketone, or a mixture thereof.

5. The composition of claim 1 wherein said composition further comprises (D) a thermal initiator.

6. The composition of claim 5 wherein said thermal initiator (D) is selected from the group consisting of substituted or unsubstituted pinacols, azo compounds, thiurams, organic peroxides, and mixtures of two or more thereof.

7. The composition of claim 1 wherein said composition further comprises (E) a latent acid catalyst.

8. The composition of claim 7 wherein said latent acid catalyst (E) is selected from the group consisting of compounds prepared by neutralizing a Bronsted acid or a Lewis acid with a Lewis base, a complex compound formed from a Lewis acid and a Bronsted salt, an ester of a sulfonic acid, an ester of phosphoric acid, an onium compound, and mixtures of two or more thereof.

9. The composition of claim 7 wherein said latent acid catalyst (E) is a triaryl sulfonium hexafluroantimonate salt.

10. The composition of claim 1 wherein in formula (A-I), n is a number in the range of about 8 to about 20.

11. The composition of claim 1 wherein in formula (A-I), n is a number in the range of about 8 to about 16.

12. The composition of claim 1 wherein (B) is selected from the group consisting of vinyl ethers, monofunctional acrylate monomers or oligomers, polyfunctional acrylate monomers or oligomers, and mixtures of two of more thereof.

13. The composition of claim 1 wherein (B) is a compound represented by the formula

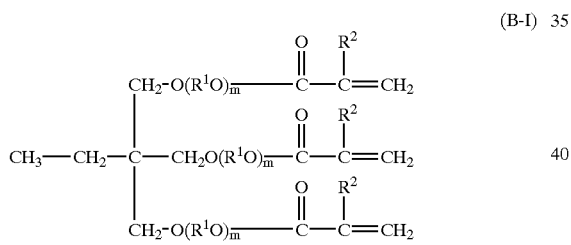

(B-I)

wherein in formula (B-I), each $R^1$ independently is a hydrocarbylene group of 1 to about 3 carbon atoms, each $R^2$ independently is hydrogen or methyl, and each m independently is a number in the range of 1 to about 30.

14. The composition of claim 13 wherein in formula (B-I), each $R^1$ independently has 2 or 3 carbon atoms.

15. The composition of claim 13 wherein in formula (B-I), each $R^2$ independently is hydrogen or methyl.

16. The composition of claim 13 wherein in formula (B-I), each $R^1$ has 2 carbon atoms, each $R^2$ is hydrogen, and each m is about 1 to about 6.

17. The composition of claim 1 wherein said composition comprises from about 30% to about 95% by weight of (A), and from about 5% to about 70% by weight by (B).

18. The composition of claim 1 wherein (B) is a reactive vinyl monomer or oligomer.

19. A curable coating composition, comprising:

(A) a compound represented by the formula

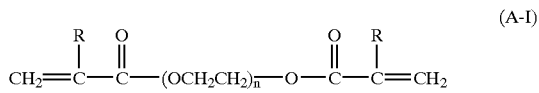

(A-I)

wherein in formula (A-I), each R independently is hydrogen or methyl, and n is a number that is about 6 or higher; and (B) a compound represented by the formula

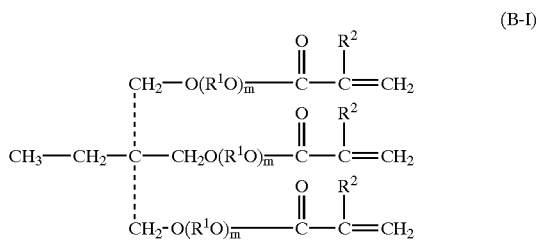

(B-I)

wherein in formula (B-I) each $R^1$ independently is a hydrocarbylene group of 1 to about 3 carbon atoms, each $R^2$ independently is hydrogen or a methyl group, and each m independently is a number in the range of about 1 to about 30.

20. The composition of claim 19 wherein said composition further comprises benzophenone, 1-hydroxycyclohexyl phenyl ketone, or a mixture thereof.

21. The composition of claim 19 wherein said composition further comprises a triaryl sulfonium hexafluroantimonate salt.

22. A method of coating a substrate comprising applying to said substrate the coating composition of claim 1, and curing said coating composition.

23. The method of claim 22 wherein said coating composition comprises a photoinitiator, and said composition is cured by ultraviolet radiation or visible light.

24. The method of claim 22 wherein said coating composition does not contain a photoinitiator, and said composition is cured by electron beam radiation.

25. The method of claim 22 wherein said coating composition is cured by heating said coating composition.

26. The method of claim 22 wherein said substrate is a polymeric film.

\* \* \* \* \*